United States Patent

[11] 3,598,138

| [72] | Inventor | Benjamin H. Hadley<br>692 W. 9th St., Claremont, Calif. 91711 |
|---|---|---|
| [21] | Appl. No. | 17,149 |
| [22] | Filed | Mar. 6, 1970 |
| [45] | Patented | Aug. 10, 1971 |

[54] PRESSURE CONTROLLER
14 Claims, 5 Drawing Figs.

[52] U.S. Cl. .................................................. 137/82,
137/85, 137/596.16, 73/401, 137/86
[51] Int. Cl. .................................................. G05d 11/50,
G05d 13/00
[50] Field of Search .................................. 137/82, 85,
596.16; 73/401

[56] References Cited
UNITED STATES PATENTS
| 1,887,322 | 11/1932 | Nettleton .................. | 137/82 |
| 2,566,708 | 9/1951 | Trevaskis .................. | 137/596.16 |
| 3,296,867 | 1/1967 | Schwien .................. | 73/401 |

Primary Examiner—Alan Cohan
Attorney—Harris, Kiech, Russell & Kern

ABSTRACT: A dynamic pressure controller for generating a pressure at a desired value with high accuracy and stability. A manometer supplying an error signal varying as a function of the difference between a reference pressure and the pressure in the output line. A pair of control valves coupled to the output line, with one valve having a low-pressure source as an input and the other having a high-pressure source as the input, a pressure regulator connected across each of the control valves to maintain substantially constant pressure drop thereacross, and amplifiers for driving both valves as a function of the error signal, with the valves operating in the partially open condition for the zero pressure difference condition, and with the valves having floating poppets actuated magnetically against nonmagnetic seats.

INVENTOR
BENJAMIN H. HADLEY
BY HIS ATTORNEYS
HARRIS, KIECH, RUSSELL & KERN

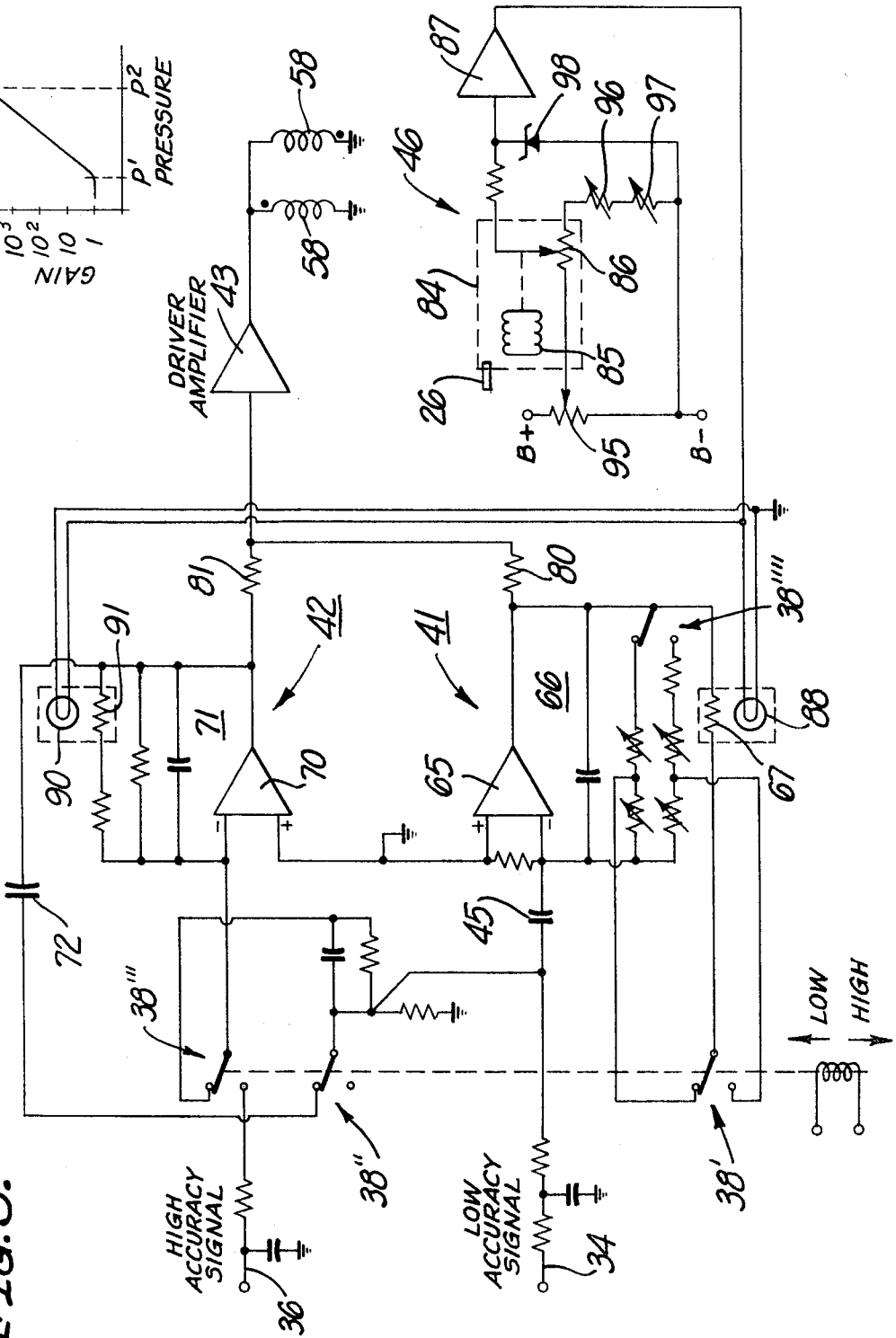
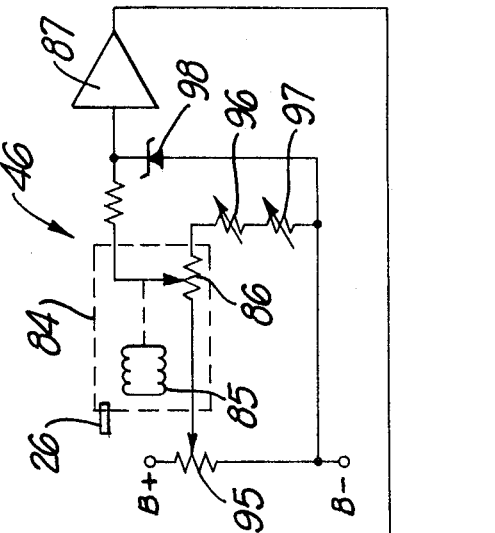
Fig. 3.
Fig. 4.

PRESSURE CONTROLLER

This invention relates to pressure controllers for supplying pressures to output lines at a desired value and, in particular, to a new and improved pressure controller with greatly improved accuracy and stability and one which rapidly stabilizes at a new output value. Very accurate manometers are now available and one such instrument is illustrated in U.S. Pat. No. 3,296,867. An instrument of this type will measure pressure differences with an accuracy of 0.0005 inch of mercury over the range of 0 inch Hg abs. to 250 inches Hg abs. A manometer is utilized to set the desired value of output pressure for a pressure controller and it is an object of the present invention to provide a pressure controller suitable for use with the highly accurate manometers presently available, with the pressure controller having an accuracy and stability matching that of the manometer. The setting of the manometer can be changed to a new value with the instrument stabilizing rapidly at this new value and it is an object of the present invention to provide a pressure controller incorporating new control valves and one which can change the output pressure rapidly and which will stabilize at a new set pressure substantially as rapidly as the manometer, and which will in some cases speed the manometer settling time.

A variety of pressure controllers are known and used and the conventional diaphragm pressure regulator is suitable for many purposes. However, the conventional instruments do not have the accuracy, stability or rate of response desired for use with currently available manometers. Further, the control valves used in conventional instruments encounter difficulties with stiction and friction which limit the accuracy and sensitivity of the overall instrument.

Accordingly it is an object of the invention to provide a new and improved pressure controller incorporating first and second control valves, each including throttling means for controlling fluid flow therethrough and having a nonmagnetic valve seat, a floating magnetic poppet, and a magnetically energized poppet driver, means for connecting a low-pressure source as an input to the first control valve and for connecting a high-pressure source as an input to the second control valve, means for connecting the output of each of the valves to the output line, and actuating means having the manometer error signal as an input for simultaneously actuating each of the poppet drivers with the valves and actuating means adjusted such that both valves are partially open at the zero or null condition. A further object is to provide such a controller incorporating pressure regulators connected across each of the control valves to provide a substantially constant pressure drop across each valve.

Other objects, advantages, features and results will more fully appear in the course of the following description. The drawings merely show and the description merely describes a preferred embodiment of the present invention which is given by way of illustration or example.

In the drawings:

FIG. 3 is an electrical schematic illustrating the electrical system of FIG. 1 in greater detail; and FIG. 4 is a graph illustrating the preferred gain characteristic for the system.

Figure 1:
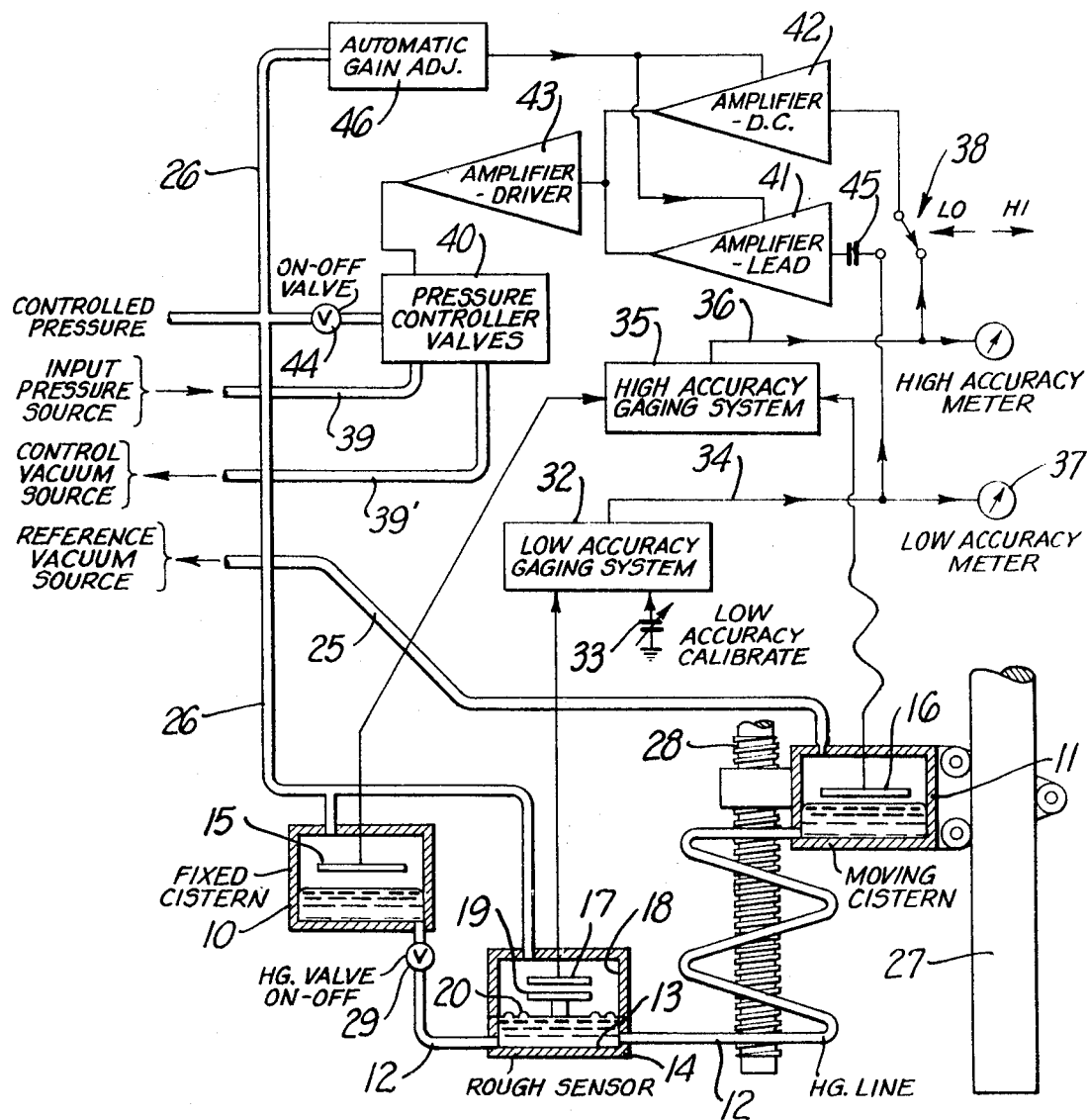
FIG. 1 is a combination mechanical, pneumatic and electrical diagram illustrating the preferred embodiment of the invention.

FIG. 1 illustrates a mercury manometer having a fixed cistern 10 and a moving cistern 11 interconnected by a mercury line 12 which passes through a mercury chamber 13 of a pressure sensor 14. A capacitor plate 15 is carried in the cistern 10 above the pool of mercury. Another capacitor plate 16 is similarly carried in the cistern 11. A capacitor plate 17 is carried in the upper chamber 18 of the sensor 14, with another capacitor plate 19 supported on a diaphragm or moving wall member 20 which separates the mercury chamber 13 and the pressure chamber 18. A reference vacuum source, typically a high vacuum pump, is connected to the area above the mercury pool in the cistern 11 by a line 25. An output line 26 is connected to the area above the mercury pool in the cistern 10 and to the pressure chamber 18 of the sensor 14. The cistern 11 is supported on a vertical shaft 27 and is driven vertically relative to the cistern 10 by a lead screw 28. An on-off valve 29 is connected in the mercury line 12 between the fixed cistern 10 and the sensor 14. The capacitor plate 19 of the sensor 14 is connected to circuit ground and the plate 17 is connected to the low accuracy gaging system 32. A variable capacitor 33 is similarly connected between circuit ground and the low accuracy system 32, which may be a conventional bridge-type circuit providing an output signal on line 34 which varies as a function of the position of the capacitor plate 19 in the sensor 14. The capacitor plates 15 and 16 of the cisterns 10 and 11, respectively, are connected to the high accuracy gaging system 35, with the mercury pools connected to circuit ground and serving as the other plate of each of the capacitors. The high accuracy system 35 may be a conventional bridge-type circuit providing an output signal on line 36 varying as a function of the difference in plate-pool spacing in the cisterns 10, 11. Mercury manometers of this general configuration are illustrated and described in U.S. Pat. Nos. 3,225,599 and 3,296,867 and reference may be made thereto for details of construction and operation.

In a typical operation, the lead screw 28 is driven by a motor or other means to position the cistern 11 at a level to produce the desired pressure. During this slewing operation, the error in the system will be large and the signal on line 34 will be large. The valve 29 will be closed, either manually based on a reading of the low accuracy meter 37 or automatically as described in the aforesaid patents. When the error signal falls below a predetermined magnitude, the system is switched from low accuracy operation to high accuracy operation, the valve 29 is opened, and a contact set 38 is switched from the low condition to the high condition. The slewing and low-high accuracy switching is described in the aforesaid patents.

The system of FIG. 1 operates to provide a pressure in the output line 26 to balance the pressure resulting from the vertical distance between the cisterns 10, 11. For example, with a zero reference pressure on line 25 and with the cisterns displaced 10 inches vertically, the pressure in line 26 will be that of 10 inches of mercury. This is achieved by providing on line 39 from the input pressure source, a pressure higher than the desired pressure, and on line 39' from the control vacuum source, a pressure lower than the desired pressure. The lines 39, 39' provide inputs to pressure controller valves 40 which are driven by amplifiers 41, 42, 43 to produce the desired pressure on output line 26. An on-off valve 44 permits disconnecting the controller valves from the output line when desired.

In the preferred embodiment illustrated herein, the controller valves are actuated by electrical coils and the amplifier 43 provides the power for driving the coils. The amplifier 41 is a capacitive coupled amplifier with an input capacitor 45, providing a lead or anticipation signal. The amplifier 42 is a direct coupled amplifier. The gain of each of the amplifiers 41, 42 may be controlled by an automatic gain adjustment unit 46 having the output line 26 as a reference input. Under low accuracy operation, the signal on line 34 is connected as an input to both amplifiers 41 and 42. Under high accuracy operation, the signal on line 44 is connected as an input to amplifier 41 and the signal on line 36 is connected as an input to amplifier 42.

Figure 2:
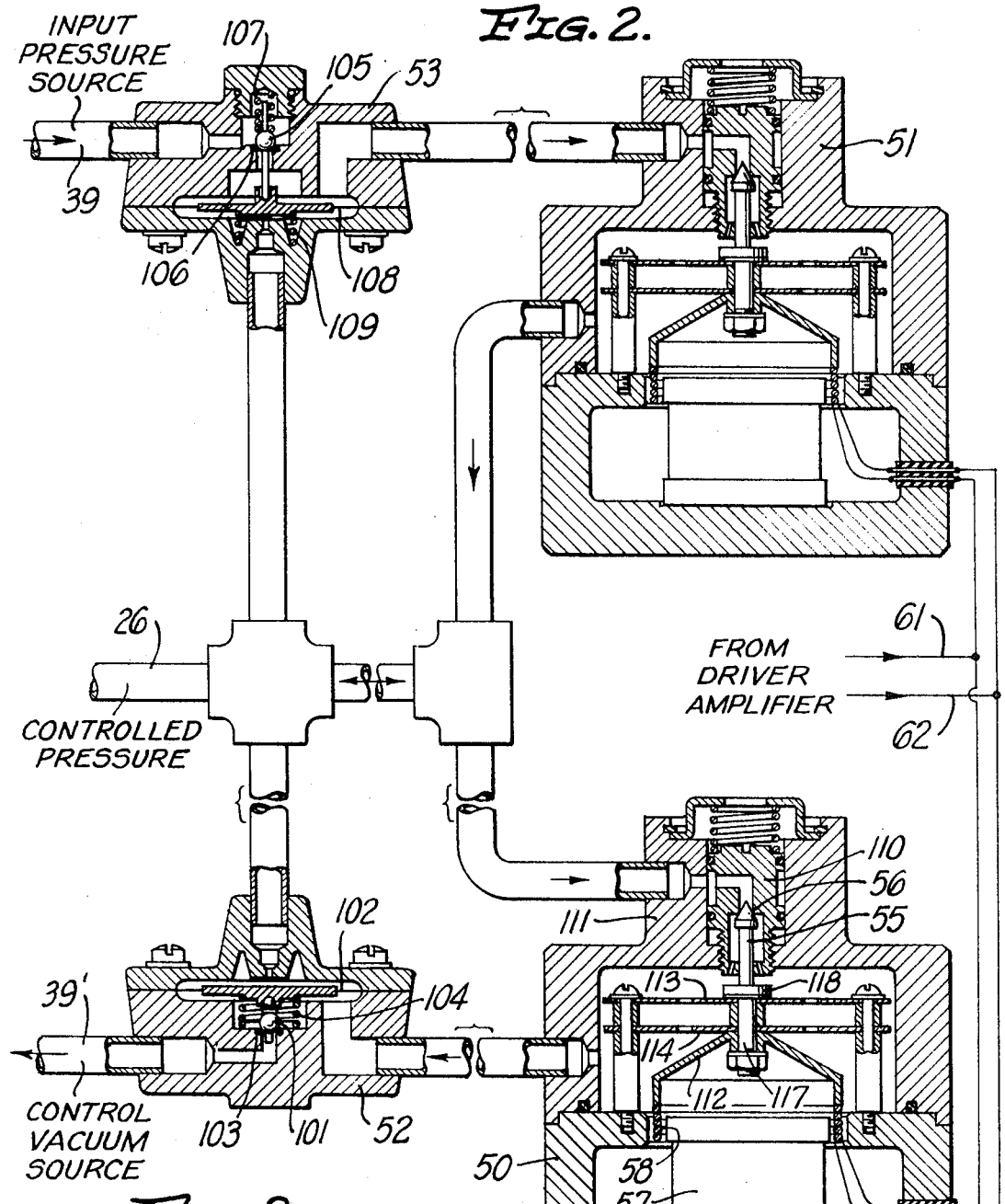
FIG. 2 is a diagram illustrating the pressure controller valves of FIG. 1.

The pressure controller valves 40 are illustrated in greater detail in FIG. 2 and include a control valve 50, a similar control valve 51, a regulator 52, and another regulator 53. The regulators 52, 53 maybe conventional pressure regulators such as regulators of the diaphragm, force balance type. The regulator 52 is connected between the line 39' and the input to the valve 50. The regulator 53 is similarly connected between the line 39 and the input to the valve 51. The output line 26 is connected as the reference pressure to each of the regulators 52, 53 so that each regulator operates to maintain the pressure drop across the corresponding valve 50, 51, substantially constant thereby providing a more constant mass flow for a given valve opening.

In regulator 52, a ball 101 is carried by a diaphragm 102 for movement toward and away from a seat 103. A spring 104 urges the diaphragm upward, with the differential pressure across the diaphragm urging it downward. In regulator 53, a ball 105 is urged downward toward a seat 106 by a spring 107 and upward by a diaphragm 108 and spring 109.

The valves 50, 51 may be identical in construction. A poppet 55 is positioned at an orifice or seat 56 and slides or floats in valve body insert 110. The insert is threadedly mounted in the upper valve body 111 providing for adjustment of the position of the " serves 56. A poppet driver 112 is supported on two resilient plates 113, 114 providing movement of the driver 112 toward and away from the seat 56. An electrical coil 58 is carried on the driver 112 and is positioned in an annular opening of a magnetic core formed by the lower valve body 59 and a magnet 57. The coil is energized from the driver amplifier 43 via lines 61, 62 and functions to move the driver 112 downward away from the seat 56 against the action of the suspension plates 113, 114.

The insert 110 is of a nonmagnetic material, such as brass or nonmagnetic-type chromium carbide, and the poppet 55 is of a magnetic material, such as iron. A bolt 117 fixed in the driver 112 is magnetically energized, as by being a permanent magnet or by being of magnetic material along with the driver 112 and being energized by the magnet 57. The poppet floats in the insert 110 and is magnetically attached to the head 118 of the bolt 117. Hence the poppet moves with the driver 112. There is no magnetic attraction to the valve seat 56 and substantially no friction between poppet and insert. The magnetic attraction of the poppet to the driver is a substantial benefit in keeping the valve from sticking.

A positive going change in the output of the amplifier 43 serves to move the poppet toward the seat in one valve and away from the seat in the other valve simultaneously to change the pressure on the output line 26. Similarly, a negative going signal change produces the opposite effect. The amplifiers and the valves are adjusted so that when in the static or null or zero error condition with the desired pressure in the output line 26, both valves are partially open. This arrangement provides minimum threshold response and maximum ability to control proportionally when near null, and maximum slew speed for any given set of conditions.

Figure 2A:
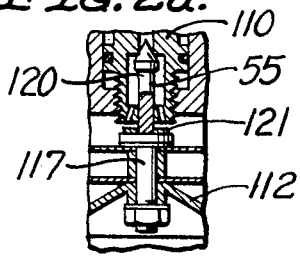
FIG. 2a shows a detail of the valve of FIG. 2.

An alternative construction for the poppet is shown in FIG. 2a, where the upper portion 120 is formed of nonmagnetic material and a ring 121 of magnetic material is fixed to the lower end of the poppet shaft.

FIG. 3 illustrates a preferred form of the electrical circuitry in greater detail. The lead amplifier 41 includes an amplifier 65 with a feedback network 66 including a capacitor and a plurality of adjustable resistors, the latter being used for trimming. Four contact sets are driven by the low-high accuracy changeover relay and are identified as 38', 38'', 38''', 38''''. The lead amplifier 41 is operative in both the low and high accuracy modes and the contact set 38'''' serves to change resistors in the feedback circuit 66. The contact set 38' switches resistor 67 in the feedback circuit. The resistor 67 is part of the automatic gain adjustment circuit and will be described in detail below.

The DC amplifier 42 includes an amplifier 70 and a feedback circuit 71 comprising a capacitor and resistors in parallel. An integrating capacitor 72 is included in the feedback network 71 by contact 38'' when operating in the low accuracy mode. Contact set 38''' selectively connects the low accuracy signal on line 34 and the high accuracy signal on line 36 as the input. The input circuitry may be conventional and preferably is designed to maintain a constant input impedance.

The outputs of the amplifiers 65, 70 are combined through coupling resistors 80, 81 to provide the input to the driver amplifier 43 which in turn provides the current for the valve coils 58.

A preferred form for the automatic gain adjustment 46 includes a closed chamber 84 with the output line 26 connected thereto. A bellows 85 drives the moving arm of a potentiometer 86 to vary the input signal to an amplifier 87 as a function of the pressure in the line 26. The amplifier 87 drives light bulbs 88, 90 which illuminate photosensitive resistors 67, 91, respectively, in the feedback networks 66 and 71. In the preferred embodiment illustrated, the circuit is operated so that the gain of amplifiers 41, 42 is constant in a first zone, increases logarithmically in a second zone, and is again constant at a higher value in a third zone. A typical pressure vs. gain relation is illustrated in FIG. 4. This relationship may be obtained with the circuit of FIG. 3 by setting the potentiometer 95 to provide the desired shape and adjusting variable resistors 96, 97 such that the input signal to the amplifier 87 for pressures below $P_1$ is not large enough to produce any significant light from the lamps 88, 90, with the values of the resistors 67, 91 remaining constant. A clamping diode 98 is connected at the input to the amplifier 87 for limiting the maximum signal so that pressures above $P_2$ do not cause any increase in output from the amplifier 87 and increase in output from the lamps 88, 90. In the pressure zone between $P_1$ and $P_2$, the lamp outputs vary with the pressure and the resistance value of the photosensitive resistors will vary logarithmically with the output of the amplifier 87 because of the characteristic of the lamps 88, 90, thereby providing the desired logarithmic relation between pressure and gain.

Variable gain in the amplifiers is desirable because the controller must operate over a wide pneumatic gain range. At the low-pressure end of the operating range, airflow tends to follow laws of molecular flow, while at the high-pressure end of the range, airflow tends to follow laws of fluid flow. In one specific instrument using the curve of FIG. 4, $P_1$ is selected as 0.5 inch Hg abs. and $P_2$ as 25 inches Hg abs.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a pressure controller for use with a manometer having means for generating an error signal varying as a function of the difference between a reference pressure and the pressure in an output line, the improvement comprising:
   first and second control valves, each of said control valves including throttling means for controlling fluid flow through the valve, each of said throttling means having means defining a valve seat of nonmagnetic material,
   a poppet carried in the valve for movement toward and away from said seat to close and open the valve, with at least a portion of said poppet being of magnetic material, and
   a poppet driver mounted in the valve adjacent said poppet for movement toward and away from the poppet and valve seat, with said driver magnetically energized for attracting the poppet;
   means for connecting a low-pressure source as an input to said first control valve;
   means for connecting a high-pressure source as an input to said second valve;
   means for connecting the output of each of said control valves to said output line; and
   valve actuating means having said error signal as an input for actuating each of said poppet drivers to simultaneously increase flow through one valve and decrease flow through the other valve as said error signal varies,
   with said valves and actuating means adjusted such that both valves are partially open for the zero difference condition.

2. A controller as defined in claim 1 in which each of said control valves includes an electrical coil disposed in a magnetic path, with said coil fixed to said poppet driver, and a flexible suspension for said poppet driver urging the driver toward said poppet and valve seat.

3. A controller as defined in claim 1 including:
a first fluid pressure regulator connected between said low-pressure source and said first control valve input;
a second fluid pressure regulator connected between said high-pressure source and said second control valve input; and
means for connecting said output line as a reference pressure to each of said regulators.

4. A controller as defined in claim 1 in which said valve actuating means includes an amplifier for amplifying said error signal; and
said controller includes means for varying the gain of said amplifier as a function of the pressure in said output line.

5. A controller as defined in claim 4 in which the amplifier gain is substantially constant in a first lower pressure zone, increases substantially logarithmically in a second intermediate pressure zone, and is substantially constant at a higher value in a third higher pressure zone.

6. A controller as defined in claim 5 wherein the higher gain of said third zone is in the order of about 10,000 times the gain of said first zone.

7. In a pressure controller for use with a manometer having interconnected first and second cisterns carrying pools of mercury with one of said cisterns disposed vertically relative to the other,
a reference pressure source connected to the upper cistern above the pool,
an output line connected to the lower cistern above the pool,
a pressure sensor comprising a mercury chamber interconnected with said cisterns, a pressure chamber connected to said output line and a movable wall member between said chambers,
means for generating a first signal varying as a function of unbalance at said first and second cisterns, and
means for generating a second signal varying as a function of movement of said wall member, the improvement comprising:
first and second control valves, each of said control valves including throttling means for controlling fluid flow through the valve, each of said throttling means having means defining a valve seat of nonmagnetic material,
a poppet carried in the valve for movement toward and away from said seat to close and open the valve, with at least a portion of said poppet being of magnetic material, and
a poppet driver mounted in the valve adjacent said poppet for movement toward and away from the poppet and valve seat with said driver magnetically energized for attracting the poppet;
means for connecting a low-pressure source as an input to said first control valve;
means for connecting a high-pressure source as an input to said second control valve;
means for connecting the output of each of said control valves to said output line; and
valve actuating means having said signals as inputs for actuating each of said poppet drivers to simultaneously increase flow through one valve and decrease flow through the other valve as said signals vary,
with said valves and actuating means adjusted such that both valves are partially open for the zero difference condition.

8. A controller as defined in claim 7 in which each of said control valves includes an electrical coil disposed in a magnetic path, with said coil fixed to said poppet driver, and a flexible suspension for said poppet driver urging the driver toward said poppet and valve seat.

9. A controller as defined in claim 8 in which said actuating means includes a first direct coupled amplifier and a second capacitive coupled amplifier, with the amplifier outputs combined to drive the coils of each of said throttling means in parallel, and means for connecting said first signal as an input to said first amplifier and said second signal as an input to said second amplifier.

10. A controller as defined in claim 7, including a third on-off valve connected between said lower cistern and said mercury chamber for blocking mercury flow therebetween when in the off position,
with said actuating means including a first direct coupled amplifier and a second capacitive coupled amplifier with the amplifier outputs combined to drive each of said poppet drivers in parallel, and
switch means for connecting said second signal as an input to each of said amplifiers when said third valve is in the off position, and connecting said first signal as an input to said first amplifier and said second signal as an input to said second amplifier when said third valve is in the on position.

11. A controller as defined in claim 7 including:
a first fluid pressure regulator connected between said low-pressure source and said first control valve input;
a second fluid pressure regulator connected between said high-pressure source and said second control valve input; and
means for connecting said output line as a reference pressure to each of said regulators to provide a substantially constant pressure drop across each of said first and second control valves.

12. A controller as defined in claim 9 including means for varying the gain of each of said amplifiers as a function of the pressure in said output line.

13. A controller as defined in claim 12 in which the amplifier gain is substantially constant in a first lower pressure zone, increases substantially logarithmically in a second intermediate pressure zone, and is substantially constant at a higher value in a third higher pressure zone.

14. A controller as defined in claim 10 including:
a first fluid pressure regulator connected between said low pressure source and said first control valve input;
a second fluid pressure regulator connected between said high pressure source and said second control valve input;
means for connecting said output line as a reference pressure to each of said regulators to provide a substantially constant pressure drop across each of said first and second valves; and
means for varying the gain of each of said amplifiers as a function of the pressure in said output line.